(12) United States Patent
Matsusue et al.

(10) Patent No.: US 11,634,509 B2
(45) Date of Patent: Apr. 25, 2023

(54) FIBROUS CELLULOSE, METHOD FOR MANUFACTURING SAME, AND RESIN COMPOSITION

(71) Applicant: Daio Paper Corporation, Ehime (JP)

(72) Inventors: Ikko Matsusue, Ehime (JP); Aya Fujita, Ehime (JP)

(73) Assignee: Daio Paper Corporation, Ehime (JP)

( * ) Notice: Subject to any disclaimer, the term of this patent is extended or adjusted under 35 U.S.C. 154(b) by 288 days.

(21) Appl. No.: 16/967,482

(22) PCT Filed: Feb. 5, 2019

(86) PCT No.: PCT/JP2019/003959
§ 371 (c)(1),
(2) Date: Aug. 5, 2020

(87) PCT Pub. No.: WO2019/156047
PCT Pub. Date: Aug. 15, 2019

(65) Prior Publication Data
US 2021/0214464 A1 Jul. 15, 2021

(30) Foreign Application Priority Data

Feb. 6, 2018 (JP) .............................. JP2018-019013

(51) Int. Cl.
| | | |
|---|---|---|
| C08B 3/20 | (2006.01) | |
| C08B 3/12 | (2006.01) | |
| C08L 1/02 | (2006.01) | |
| C08L 23/12 | (2006.01) | |

(52) U.S. Cl.
CPC .................. *C08B 3/20* (2013.01); *C08B 3/12* (2013.01); *C08L 1/02* (2013.01); *C08L 23/12* (2013.01); *C08L 2205/16* (2013.01)

(58) Field of Classification Search
CPC ..... C08B 3/20; C08B 3/12; C08L 1/02; C08L 23/12; C08L 2205/16

USPC .......................................................... 524/35
See application file for complete search history.

(56) References Cited

FOREIGN PATENT DOCUMENTS

| | | | |
|---|---|---|---|
| JP | 2010-106251 | 5/2010 | |
| JP | 2012-229350 | 11/2012 | |
| JP | 2013-136859 | 7/2013 | |
| JP | 2014-105407 | 6/2014 | |
| JP | 2016-89077 | 5/2016 | |
| JP | 2016-176052 | 10/2016 | |
| JP | 2017-25338 | 2/2017 | |
| JP | 2017-66274 | 4/2017 | |
| JP | 2019-007117 | 1/2019 | |
| WO | WO-2012120971 A1 * | 9/2012 | ............... C08H 6/00 |
| WO | 2012/120971 | 7/2014 | |
| WO | 2013/147063 | 12/2015 | |
| WO | 2014/087767 | 1/2017 | |

OTHER PUBLICATIONS

International Search Report for PCT/JP2019/003959, dated Apr. 16, 2019.

* cited by examiner

*Primary Examiner* — Ling Siu Choi
*Assistant Examiner* — Ronald Grinsted
(74) *Attorney, Agent, or Firm* — Andrus Intellectual Property Law

(57) ABSTRACT

A fibrous cellulose having an excellent resin reinforcing effect, a method for manufacturing the fibrous cellulose, and a resin composition having high strength. The fibrous cellulose is microfiber cellulose having an average fiber diameter of 1 μm or more, and is hydrophobically modified. The method for manufacturing fibrous cellulose includes defibrating raw material fiber to obtain microfiber cellulose with an average fiber diameter of 1 μm or more, and hydrophobically modifying the microfiber cellulose. Further, the resin composition contains the fibrous cellulose and resin.

6 Claims, No Drawings

FIBROUS CELLULOSE, METHOD FOR MANUFACTURING SAME, AND RESIN COMPOSITION

CROSS-REFERENCE TO RELATED APPLICATIONS

This application is the U.S. national stage application of International Application PCT/JP2019/003959, filed Feb. 5, 2019, which international application was published on Aug. 15, 2019, as International Publication WO 2019/156047 in the Japanese language. The International Application claims priority of Japanese Patent Application No. 2018-019013, filed Feb. 6, 2018. The international application and Japanese application are both incorporated herein by reference, in entirety.

TECHNICAL FIELD

The present invention relates to fibrous cellulose, a method for manufacturing the same, and a resin composition.

BACKGROUND ART

In recent years, attention has been paid to nanotechnology aimed at making a substance finer to a nanometer level to obtain new physical properties different from conventional properties of the substance. Cellulose nanofiber (fine cellulose fiber) manufactured from pulp fiber as a cellulose-based raw material by chemical treatment, grinding treatment or the like has excellent strength, elasticity, thermal stability, and the like, and is therefore expected to be used in industrial applications as filter materials, filter aids, base materials for ion exchangers, fillers for chromatography analyzers, fillers for blending resin and rubber, and the like, and applications for blending agents of cosmetics such as lipsticks, powder cosmetics and emulsified cosmetics. Cellulose nanofiber (CNF) has excellent aqueous dispersibility, and is therefore expected to be used in many applications such as a viscosity retention agent for food, cosmetics, a paint or the like, a strengthening agent for a food raw material dough, a moisture retention agent, a food stabilizer, a low-calorie additive, and an emulsion stabilization aid. In particular, it is currently proposed that the cellulose nanofiber obtained by making plant fiber finer be used as a reinforcing material for resin. The cellulose nanofiber is said to have weight ⅕ times as large as that of steel and strength 5 times as large as that of steel.

However, when the cellulose nanofiber is used as a reinforcing material for resin, the cellulose nanofiber irreversibly aggregates due to intermolecular hydrogen bonds derived from hydroxyl groups of a polysaccharide. Therefore, there is the problem that even when the cellulose nanofiber is used as a reinforcing material, a sufficient resin reinforcing effect is not exhibited because of poor dispersibility of the cellulose nanofiber in resin.

Thus, Patent Literatures 1 and 2 propose a method in which pulp fiber is modified with an alkanoyl group, and the pulp fiber modified with the alkanoyl group is kneaded with resin. In this method, pulp fiber is modified with the alkanoyl group for facilitating dispersion in resin, and the pulp modified with the alkanoyl group is made finer (made into nanosize) concurrently with kneading the alkanoyl group-modified pulp with resin. However, modification of pulp fiber with the alkanoyl group requires a large amount of chemicals and solvents, and thus has a problem in terms of economic efficiency. Even pulp fiber modified with the alkanoyl group requires a large amount of energy for making the pulp fiber finer concurrently with kneading the pulp fiber with resin.

Patent Literature 3 proposes a method for manufacturing a fine fibrous cellulose-containing substance that includes a phosphate group introducing step, a defibration step and an organic group introducing step (step of mixing a surface modifier) in this order, and having a solvent substitution step before the organic group introducing step; and a method for manufacturing a resin composition by kneading the thus-obtained fine fibrous cellulose-containing substance with resin. The literature recommends that for improving compatibility of the fine fibrous cellulose-containing substance with resin, the fine fibrous cellulose-containing substance be formed into a sheet, and the sheet of the fine fibrous cellulose-containing substance be ground and mixed with the resin. However, the method has a problem of solvent treatment because a solvent substitution step is carried out before the organic group introduction step, and the method is poor in energy efficiency because the fine fibrous cellulose-containing substance is formed into a sheet, and ground before being mixed with resin.

Further, Patent Literature 4 proposes a method in which cellulose is made finer in resin to obtain cellulose nanofiber, and the cellulose nanofiber in the resin is reacted with a cyclic polybasic acid anhydride to obtain modified cellulose nanofiber. However, the obtained modified cellulose nanofiber does not have good dispersibility in resin, and therefore the reinforcing effect is not sufficient.

CITATION LIST

Patent Literature

Patent Literature 1: JP 2016-176052 A
Patent Literature 2: JP 2017-25338 A
Patent Literature 3: JP 2017-66274 A
Patent Literature 4: WO 2013/147063

SUMMARY OF INVENTION

Technical Problem

A main problem to be solved by the present invention is to provide fibrous cellulose having an excellent resin reinforcing effect, a method for manufacturing the fibrous cellulose, and a resin composition having high strength.

Solution to Problem

For solving the above-described problems, the present inventors subjected cellulose nanofiber to various treatments, and sought a method for mixing cellulose nanofiber with resin. That is, the present inventors conducted various studies on the premise of using the cellulose nanofiber. However, in combination of the cellulose nanofiber with resin, dispersibility in the resin was not sufficient even though the fiber was hydrophobically modified, it was difficult to form a sufficient three-dimensional network in the resin, and a sufficient reinforcing effect was not obtained. However, in the process of the studies, the present inventors found that when raw material fiber was hydrophobically modified, microfiber cellulose had better dispersibility in resin than cellulose nanofiber as a raw material fiber, and it enabled formation of a more sufficient three-dimensional network in resin, gave a better reinforcing effect, and was more preferable for solving the above-described problems than cellulose nanofiber as a raw material fiber. In this way, the present inventors achieved the present invention.

Means for solving the above problems are as follows.

Fibrous cellulose which is microfiber cellulose with an average fiber diameter of 1 µm or more, the microfiber cellulose being hydrophobically modified.

The fibrous cellulose, wherein in the microfiber cellulose, the average fiber diameter is 1 µm or more, the ratio of fiber with the fiber length of 0.2 mm or less is 12% or more, and a part of hydroxyl groups of cellulose forming the fiber are substituted with a functional group represented by the following structural formula (1) or (2).

[Chemical Formula 1]

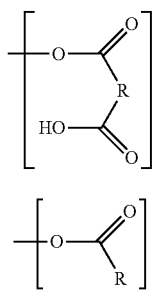

Structural formula (1)

Structural formula (2)

R in the structural formula is one of a linear, branched or cyclic saturated hydrocarbon group or a derivative thereof; a linear, branched or cyclic unsaturated hydrocarbon group or a derivative thereof; and an aromatic group or a derivative thereof.

A resin composition including the fibrous cellulose described herein, and resin.

A method for manufacturing fibrous cellulose, including defibrating raw material fiber to obtain microfiber cellulose with an average fiber diameter of 1 µm or more, and hydrophobically modifying the microfiber cellulose.

The method for manufacturing fibrous cellulose, wherein the hydrophobic modification is performed by reaction of the microfiber cellulose with polybasic acid anhydride, and as the polybasic acid anhydride, one represented by the structural formula (3) or (4) is used.

[Chemical Formula 2]

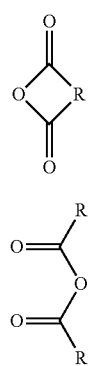

Structural formula (3)

Structural formula (4)

R in the structural formula is one of a linear, branched or cyclic saturated hydrocarbon group or a derivative thereof; a linear, branched or cyclic unsaturated hydrocarbon group or a derivative thereof; and an aromatic group or a derivative thereof.

Advantageous Effects of Invention

The present invention provides fibrous cellulose having an excellent resin reinforcing effect, a method for manufacturing the fibrous cellulose, and a resin composition having high strength.

DESCRIPTION OF EMBODIMENTS

An embodiment of the present invention will now be described. This embodiment is an example of the present invention, and the scope of the present invention is not limited to the scope of this embodiment.

The fibrous cellulose of this embodiment is obtained by hydrophobically modifying microfiber cellulose with an average fiber diameter of 1 µm or more, preferably 1 to 15 µm. Since this fibrous cellulose has an excellent resin reinforcing effect, it is preferred to use the fibrous cellulose in combination with resin, and the resulting resin composition has high strength.

(Raw Material Fiber)

Microfiber cellulose (MFC) can be obtained by beating (defibrating) raw material fiber (pulp fiber). As fiber to be used as a raw material, one or more selected from plant-derived fiber, animal-derived fiber, microorganism-derived fiber, and the like can be used. However, it is preferable to use pulp fiber which is plant fiber. When the raw material fiber is pulp fiber, the cost can be reduced, and the problem of thermal recycling can be avoided.

As plant-derived fiber, one or more selected from wood pulp made from hardwood, softwood, and the like, non-wood pulp made from straw, bagasse, and the like, waste paper pulp (DIP) made from waste paper, damaged paper, and the like can be used.

As wood pulp, one or more selected from chemical pulp such as hardwood kraft pulp (LKP) and softwood kraft pulp (NKP), and mechanical pulp (TMP), waste paper pulp (DIP) and the like can be used. The above-mentioned pulp is pulp used for papermaking, and use of such pulp enables effective utilization of existing facilities.

The hardwood kraft pulp (LKP) may be leaf bleached kraft pulp, leaf non-bleached kraft pulp or leaf semi-bleached kraft pulp. Similarly, the needle kraft pulp (NKP) may be softwood needle bleached kraft pulp, needle unbleached kraft pulp or needle semi-bleached kraft pulp.

The waste paper pulp (DIP) may be any of magazine waste paper pulp (MDIP), newspaper waste paper pulp (NDIP), corrugated waste paper pulp (WP), and other waste paper pulp.

Further, as the mechanical pulp, for example, one or more selected from stone ground pulp (SGP), pressure stone ground pulp (PGW), refiner ground pulp (RGP), chemi ground pulp (CGP), thermo ground pulp (TGP), ground pulp (GP), thermomechanical pulp (TMP), chemi thermo mechanical pulp (CTMP), refiner mechanical pulp (RMP), bleached thermo mechanical pulp (BTMP), and the like can be used.

(Pretreatment Step)

Preferably, the raw material fiber is pretreated by a chemical method. By pretreating the raw material fiber by a chemical method prior to beating (defibration) treatment, the number of beating treatments can be significantly decreased, so that energy for the beating treatment can be significantly reduced.

Examples of the pretreatment by a chemical method include hydrolysis of a polysaccharide with an acid (acid treatment), hydrolysis of a polysaccharide with an enzyme (enzyme treatment), swelling of a polysaccharide with an alkali (alkali treatment), oxidation of a polysaccharide with an oxidizing agent (oxidation treatment), and reduction (reduction treatment) of a polysaccharide with a reducing agent.

Alkali treatment performed prior to the beating treatment has an effect such that a part of hydroxyl groups of hemicellulose and cellulose in the pulp are dissociated, and the molecules are anionized to weaken the intramolecular and intermolecular hydrogen bonds, resulting in promotion of dispersion of pulp fiber in the beating treatment.

Examples of the alkali that can be used include sodium hydroxide, lithium hydroxide, potassium hydroxide, aqueous ammonia solution, organic alkalis such as tetramethylammonium hydroxide, tetraethylammonium hydroxide, tetrabutylammonium hydroxide and benzyltrimethylammonium hydroxide, and it is preferable to use sodium hydroxide from the viewpoint of production cost.

Enzyme treatment, acid treatment or oxidation treatment performed prior to the beating treatment enables reduction of the water holding degree, enhancement of the degree of crystallinity and improvement of the homogeneity of the microfiber cellulose. Accordingly, a high-strength resin composition capable of retaining ductility of resin may be obtained because it is considered that dispersibility in resin is improved as the water holding degree of the microfiber cellulose decreases, and the number of defects as destructive factors decreases as the homogeneity of the microfiber cellulose is improved. In addition, by enzyme treatment, acid treatment or oxidation treatment, amorphous regions of the hemicellulose and cellulose in the pulp are degraded. As a result, energy for beating treatment can be reduced, and the homogeneity and dispersibility of the fiber can be improved. Moreover, when the ratio of cellulose crystal regions, which have aligned molecular chains and which are considered rigid and low in water holding degree, to the entire fiber increases, dispersibility is improved, so that although the aspect ratio is supposed to decrease, a resin composition retaining ductility and having high mechanical strength can be obtained.

It is preferable to perform enzyme treatment, and it is more preferable to perform one or more treatments selected from acid treatment, alkali treatment, and oxidation treatment, among the above various treatments.

The enzyme treatment will now be described in detail.

The enzyme treatment is performed for facilitating defibration of cellulose-based fiber. It is preferable to use at least one of a cellulase-based enzyme and a hemicellulase-based enzyme, and it is more preferable to use both the enzymes in combination as the enzyme.

A cellulase-based enzyme is an enzyme which causes degradation of cellulose in the presence of water.

Examples of the cellulase-based enzyme include enzymes produced by *Trichoderma* (filamentous fungus), *Acremonium* (filamentous fungus), *Aspergillus* (filamentous fungus), *Phanerochaete* (basidiomycete), *Trametes* (basidiomycete), *Humicola* (filamentous fungus), *Bacillus* (bacteria), *Schizophyllum* (basidiomycete) and *Streptomyces* (bacteria) and *Pseudomonas* (bacteria).

These cellulase-based enzymes can be purchased as reagents or commercially available products. Examples thereof include Cellulosin T2 (manufactured by HIB Enzymes Inc.), Meicelase (manufactured by Meiji Seika Kaisha, Limited), Novozymes 188 (manufactured by Novozymes A/S), Multifect CX10L (manufactured by Genencor Company), and Cellulase-Based Enzyme GC220 (manufactured by Genencor Company).

Among these cellulase-based enzymes, filamentous fungal cellulase-based enzymes are preferable, and among the filamentous fungal cellulase-based enzymes, cellulase-based enzymes produced by *Trichoderma* fungus (*Trichoderma reesei* or *Hyporea jerorina*, ascomycete which is one of filamentous fungi) are preferable. These cellulase-based enzymes have high productivity with a wide variety of types.

Cellulase-based enzymes are classified into glycoside hydorolase families (GH families) based on the higher-order structure of the catalytic domain having a hydrolysis reaction function. Cellulase-based enzymes are classified into endo-glucanase (EG) and cellobiohydrolase (CBH) according to their cellulolytic properties.

EG has high ability to hydrolyze amorphous portions of cellulose and cellulose derivatives such as soluble cellooligosaccharides and carboxymethylcellulose, and randomly cleaves their molecular chains from the inside to reduce the degree of polymerization, but has low reactivity with cellulose microfibrils having crystallinity.

On the other hand, CBH also degrades crystalline portions of cellulose to give cellobiose. CBH is hydrolyzed from the end of the cellulose molecule, and is also called an exo-type or processive enzyme. EG is also called a non-processive enzyme.

In this embodiment, any of EG or CBH can be used as the cellulase enzyme. EG and CBH may be used alone, or in combination thereof. The cellulase-based enzyme may be used in combination with a hemicellulase-based enzyme. By appropriately combining EG and CBH, the degree of crystallinity of cellulose nanofiber can be adjusted.

The hemicellulase-based enzyme is an enzyme which causes degradation of hemicellulose in the presence of water.

Examples of the hemicellulase-based enzyme include xylanase being an enzyme which degrades xylan, mannase being an enzyme which degrades mannan, and arabanase being an enzyme which degrades araban can be used. Pectinase being an enzyme which degrades pectin can also be used as a hemicellulase-based enzyme. Microorganisms that produce a hemicellulase enzyme often produce a cellulase-based enzyme.

Hemicellulose is a polysaccharide other than pectin present between cellulose microfibrils of plant cell walls. Hemicellulose is diverse and varies depending on a kind of wood and a cell wall layer. On the secondary wall of softwood, hemicellulose contains glucomannan as a main component, and on the secondary wall of hardwood, hemicellulose contains 4-O-methylglucuronoxylan as a main component. Thus, it is preferable to use mannase for obtaining microfiber cellulose from needle bleached kraft pulp (NBKP), and it is preferable to use xylanase in the case of leaf bleached kraft pulp (LBKP).

The addition amount of the enzyme with respect to the raw material fiber is not particularly limited, and can be appropriately adjusted according to the kind of enzyme, the kind of wood (softwood or hardwood), the kind of mechanical pulp, and the like. However, the addition amount of the enzyme with respect to the raw material fiber (raw material pulp) is preferably 0.1% by mass to 3% by mass, more preferably 0.3% by mass to 2.5% by mass, particularly preferably 0.5% by mass to 2% by mass. When the addition amount is less than 0.1% by mass, the effect of the enzyme may be reduced. On the other hand, when the addition amount is more than 3% by mass, the cellulose may be saccharified, leading to reduction of the yield of microfiber cellulose. Even when the enzyme is added in an excessive amount, improvement of the effect, which matches an increase in addition amount, cannot be achieved.

The pH of the raw material fiber at the time of cellulase-based enzyme treatment is preferably within a weak acidity range (pH=3.0 to 6.9) from the viewpoint of enzyme reactivity. On the other hand, the pH of the pulp fiber at the time of hemicellulase-based enzyme treatment is preferably within a weak alkalinity range (pH=7.1 to 10.0).

The temperature during enzyme treatment is not particularly limited, and the temperature at the time of treatment with the cellulase-based enzyme or the hemicellulase-based enzyme is preferably 30° C. to 70° C., more preferably 35° C. to 65° C., particularly preferably 40° C. to 60° C. When the temperature at the time of enzyme treatment is equal to or higher than the lower limit, the enzyme activity hardly decreases, so that an increase in treatment time can be prevented. When the temperature at the time of enzyme treatment is equal to or lower than the upper limit, inactivation of the enzyme can be prevented.

The enzyme treatment time can be adjusted according to the kind of enzyme, the temperature, the pH, and the like. The enzyme treatment time is preferably 0.5 to 24 hours. When the treatment time is less than 0.5 hours, the effect of enzyme treatment may be hardly exhibited. When the treatment time is 24 hours or less, reduction of the fiber length due to degradation of the cellulose fibers by the enzyme can be suppressed, so that it is possible to obtain a sufficient strength enhancing effect when the fiber is blended with resin.

It is preferable to inactivate the enzyme after enzyme treatment is performed. Unless the enzyme is inactivated, the enzymatic reaction proceeds, so that the fiber is saccharified, leading to a decrease in yield, or the fiber length becomes excessively short, which is not preferable.

Examples of the method for inactivating the enzyme include a method in which an alkaline aqueous solution (the pH of which is preferably 10 or more, more preferably 11 or more) is added; and a method in which hot water at 80 to 100° C. is added.

(Beating Treatment Step)

The beating treatment can be performed using, for example, a beater, a homogenizer such as a high-pressure homogenizer or a high-pressure homogenizing apparatus, a millstone-type friction machine such as a grinders or a mill, a single-screw kneading machine, a multi-screw kneading machine, a kneader, a refiner, or the like. Use of a refiner is preferable. The refiner is a device for beating pulp fiber, and a known device can be used. The refiner is preferably a conical-type refiner, a double disc refiner (DDR) or a single disc refiner (SDR) from the viewpoint of enabling efficient application of a shear force to pulp fiber to perform preliminary defibration. It is preferable to use a refiner in the defibration treatment step from the viewpoint of eliminating necessity of separation and cleaning after treatment.

The microfiber cellulose is fiber composed of cellulose or a cellulose derivative. Usual microfiber cellulose has high affinity for water, and adapts to water in an aqueous medium to stably maintain a dispersed state (in a state of dispersion). A plurality of monofilaments forming the microfiber cellulose may aggregate to form fiber in an aqueous medium. The average fiber diameter (average diameter of monofilaments) of the usual microfiber cellulose is 1 to 15 μm. The average fiber length is 5 to 0.03 mm.

The number average fiber diameter (average diameter of monofilaments) of the microfiber cellulose is preferably 1 to 15 μm, more preferably 1 to 9 μm. When the average fiber diameter is 1 to 15 μm, an excellent resin composition reinforcing effect is obtained.

Specifically, when the average fiber diameter is less than 1 μm, the microfiber cellulose is not different from cellulose nanofiber, and a sufficient reinforcing effect (particularly bending elastic modulus) cannot be obtained. In addition, the time required for fining treatment increases, so that a large amount of energy is required, leading to an increase in manufacturing cost. On the other hand, when the average fiber diameter is more than 15 μm, the fiber tends to have poor dispersibility. When the dispersibility of the fiber is insufficient, the fiber tends to have a poor resin composition reinforcing effect.

The average fiber length (length of monofilaments) of the microfiber cellulose is preferably 5 to 0.03 mm, more preferably 2 to 0.05 mm, particularly preferably 1 to 0.1 mm. When the average fiber length is less than 0.03 mm, it may be impossible to form a three-dimensional network of fibers, leading to marked reduction of the reinforcing effect. The average fiber length can be arbitrarily adjusted by, for example, selection of raw material fiber, pretreatment or beating treatment.

In this embodiment, the ratio of fiber with a fiber length of 0.2 mm or less in the microfiber cellulose is preferably 12% or more, more preferably 16% or more, particularly preferably 26% or more. If the ratio is less than 12%, a sufficient reinforcing effect cannot be obtained. The upper limit of the ratio of fiber with a fiber length of 0.2 mm or less in the microfiber cellulose is not specified, and all the fiber may have a length of 0.2 mm or less.

The aspect ratio of the microfiber cellulose is preferably 2 to 5,000, and more preferably 100 to 1,000, for improving the mechanical strength while maintaining a certain degree of ductility of resin.

The aspect ratio is a value obtained by dividing the average fiber length by the average fiber width. When the aspect ratio increases, the number of areas where engagement occurs in resin increases, and therefore the reinforcing effect is enhanced, but the ductility of the resin may decrease as the number of engagements increases. It has been pointed out that when an inorganic filler is kneaded with the resin, an increase in aspect ratio of the filler improves tensile strength, but markedly reduces tensile rupture elongation.

The degree of crystallinity of the microfiber cellulose is preferably 50% or more, more preferably 55% or more, particularly preferably 60% or more. When the crystallinity is less than 50%, compatibility with the resin is improved, but the strength of the fiber itself tends to decrease, resulting in a poor resin composition reinforcing effect.

On the other hand, the degree of crystallinity of the microfiber cellulose is preferably 90% or less, more preferably 88% or less, particularly preferably 86% or less. When the crystallinity is more than 90%, the ratio of strong hydrogen bonds in the molecule increases, so that the fiber itself becomes rigid, but compatibility with the resin tends to decrease, resulting in a poor resin composition reinforcing effect. In addition, it tends to be difficult to chemically modify the microfiber cellulose. The degree of crystallinity can be arbitrarily adjusted by, for example, selection of raw material fiber, pretreatment or fining treatment.

The pulp viscosity of the microfiber cellulose is preferably 2 cps or more, more preferably 4 cps or more. When the pulp viscosity is less than 2 cps, it tends to be impossible to sufficiently suppress aggregation of the microfiber cellulose at the time of kneading the microfiber cellulose with the resin, resulting in a poor resin composition reinforcing effect.

The freeness of the microfiber cellulose is preferably 500 cc or less, more preferably 300 cc or less, particularly preferably 100 cc or less. When the freeness is more than 500 cc, the fiber width of the microfiber cellulose is more than 15 μm, so that reinforcing effect is not sufficient.

(Hydrophobic Modification)

Examples of the method for hydrophobically modifying the microfiber cellulose include esterification, etherification, amidation and sulfidation. It is preferable to employ esterification as the method for hydrophobically modifying the microfiber cellulose.

Examples of the esterification method include esterification with a hydrophobizing agent such as carboxylic acid, a carboxylic acid halide, acetic acid, propionic acid, acrylic acid, methacrylic acid, phosphoric acid, sulfonic acid, polybasic acid anhydride or a derivative thereof. It is preferable to use polybasic acid anhydride or a derivative thereof as the hydrophobizing agent.

Examples of the method for hydrophobic modification include methods in which pulp fiber is hydrophobically modified (and then formed into microfiber cellulose by beating treatment); methods in which microfiber cellulose is hydrophobically modified; and methods in which pulp fiber is hydrophobically modified while pulp fiber is defibrated into microfiber cellulose (while beating treatment is performed). It is preferable to hydrophobically modify microfiber cellulose.

In the method in which microfiber cellulose is hydrophobically modified, hydrophobic modification may be performed in steps of dehydrating, drying, and grinding the microfiber cellulose, and a step of kneading the microfiber cellulose with resin. When the microfiber cellulose is kneaded with resin, i.e. formed into a resin composition, it is preferable to perform hydrophobic modification in the kneading step.

The microfiber cellulose or pulp fiber may be hydrophobically modified without a solvent, or with a solvent such as a protic polar solvent, an aprotic polar solvent, a nonpolar solvent, or resin. It is preferable to use resin as the solvent.

Examples of the protic polar solvent that can be used include formic acid, butanol, isobutanol, nitromethane, ethanol, methanol, acetic acid, and water.

Examples of the aprotic polar solvent that can be used include N-methylpyrrolidone, tetrahydrofuran, ethyl acetate, acetone, dimethylformamide, acetonitrile, dimethylsulfoxide and propylene carbonate.

Examples of the non-polar solvent that can be used include hexane, benzene, toluene, chloroform, diethyl ether and dichloromethane.

Examples of the resin that can be used include thermoplastic resins or thermosetting resins.

As the thermoplastic resin, one or more selected from polyolefins such as polypropylene (PP) and polyethylene (PE), polyester resins such as aliphatic polyester resins and aromatic polyester resins, polyacrylic resins such as polystyrene, methacrylate and acrylate, polyamide resin, polycarbonate resin, polyacetal resin and the like can be used.

It is preferable to use at least one of polyolefin and polyester resin. It is preferable to use polypropylene as the polyolefin. Examples of the polyester resin include aliphatic polyester resins such as polylactic acid and polycaprolactone, and aromatic polyester resins such as polyethylene terephthalate, and it is preferable to use polyester resin having biodegradability (referred to simply as "biodegradable resin").

As the biodegradable resin, for example, one or more selected from hydroxycarboxylic acid-based aliphatic polyester, caprolactone-based aliphatic polyester, dibasic acid polyester and the like can be used.

As the hydroxycarboxylic acid-based aliphatic polyester, for example, one or more selected from homopolymers of hydroxycarboxylic acids such as lactic acid, malic acid, glucose acid and 3-hydroxybutyric acid, copolymers obtained using at least one of these hydroxycarboxylic acids, and the like can be used. It is preferable to use polylactic acid, a copolymer of lactic acid and the hydroxycarboxylic acid other than lactic acid, polycaprolactone, a copolymer of at least one of the hydroxycarboxylic acids and caprolactone, and it is particularly preferred to use polylactic acid.

As this lactic acid, for example, L-lactic acid, D-lactic acid, and the like can be used, and one of these lactic acids may be used alone, or two or more thereof may be selected and used.

As the caprolactone-based aliphatic polyester, for example, one or more selected from homopolymers of polycaprolactone, copolymers of polycaprolactone and the above-described hydroxycarboxylic acid, and the like can be used.

As the dibasic acid polyester, for example, one or more selected from polybutylene succinate, polyethylene succinate, polybutylene adipate, and the like can be used.

The biodegradable resins may be used alone or in combination of two or more thereof.

Examples of the thermosetting resin that can be used include phenol resin, urea resin, melamine resin, furan resin, unsaturated polyester, diallyl phthalate resin, vinyl ester resin, epoxy resin, polyurethane-based resin, silicone resin and thermosetting polyimide resin. These resins can be used alone or in combination of two or more thereof.

The resin may contain an inorganic filler preferably in such a ratio that thermal cycling is not affected.

Examples of the inorganic filler include metallic elements of Group I to Group VIII of the periodic table such as Fe, Na, K, Cu, Mg, Ca, Zn, Ba, Al, Ti and silicon element, oxides, hydroxides, carbonates, sulfates, silicates and sulfites of the metallic elements, and various clay minerals composed of these compounds.

Specific examples thereof include barium sulfate, calcium sulfate, magnesium sulfate, sodium sulfate, calcium sulfite, zinc oxide, silica, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay wollastonite, glass beads, glass powder, silica sand, silica stone, quartz powder, diatomaceous earth, white carbon and glass fiber. Two or more of these inorganic fillers may be contained. The inorganic filler may be one contained in recycled pulp.

(Polybasic Acid Anhydride)

As the polybasic acid anhydride to be used in esterification of the microfiber cellulose, for example, one or more selected from maleic anhydride, phthalic anhydride, itaconic anhydride, citraconic anhydride, citric anhydride, and the like can be used. It is preferable to use maleic anhydride, more preferably phthalic anhydride.

When polybasic acid anhydride is used, the microfiber cellulose is modified (a part of hydroxyl groups are substituted with a predetermined functional group), so that the compatibility of the microfiber cellulose and the resin is improved. As a result, the strength of the obtained resin composition, particularly the bending strength is enhanced.

It is preferable that as the polybasic acid anhydride, one represented by the following structural formula (3) or (4) is used.

[Chemical Formula 2]

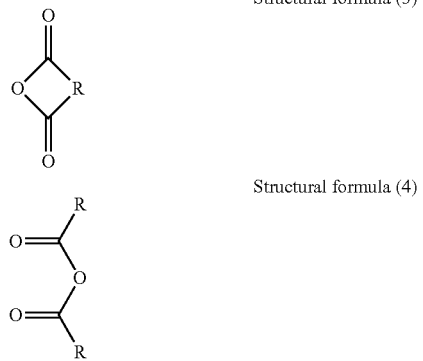

Structural formula (3)

Structural formula (4)

R in the structural formula is one of a linear, branched or cyclic saturated hydrocarbon group or a derivative thereof; a linear, branched or cyclic unsaturated hydrocarbon group or a derivative thereof; and an aromatic group or a derivative thereof.

By using polybasic acid anhydride represented by the structural formula (3) or (4), the compatibility of the microfiber cellulose and the thermoplastic resin is improved.

As the polybasic acid anhydride, one produced from polybasic acid in the step of dehydrating and drying microfiber cellulose or the kneading step may be used.

(Solubility Parameter)

The difference in solubility parameter $(cal/cm^3)^{1/2}$ (SP value) between the microfiber cellulose and the resin can be represented by the formula: a difference in SP value=$SP_{MFC}$ value–$SP_{POL}$ value, where the $SP_{MFC}$ value is the solubility parameter of the microfiber cellulose and the $SP_{POL}$ value is the solubility parameter of the resin. The difference in SP value is preferably 10 to 0.1, more preferably 8 to 0.5, particularly preferably 5 to 1. When the difference in SP value is more than 10, the microfiber cellulose is not dispersed in the resin, and thus a reinforcing effect cannot be obtained. On the other hand, when the difference in SP value is less than 0.1, the microfiber cellulose is dissolved in the resin, and does not function as a filler, and thus a reinforcing effect cannot be obtained. In this connection, the smaller the difference between the $SP_{POL}$ value of the resin (solvent) and the $SP_{MFC}$ value of the microfiber cellulose (solute), the greater the reinforcing effect. The solubility parameter $(cal/cm^3)^{1/2}$ (SP value) serves as a measure of the intermolecular force acting between the solvent and the solute, and the solubility increases as the SP values of the solvent and the solute become closer to each other.

(Other Fibers)

In the microfiber cellulose, one or more of various fine fibers which are referred to cellulose nanofiber, microfibril cellulose, microfibrillar microfiber, microfiber cellulose, microfibrillated cellulose, super microfibril cellulose, and the like can be incorporated, or may be contained. In addition, fibers obtained by making the above-mentioned fibers finer can be incorporated, or may be contained. It is necessary that the ratio of the microfiber cellulose in all the raw material fiber be 10% by mass or more, preferably 30% by mass or more, more preferably 60% by mass or more.

In addition to the above fibers, fibers derived from plant materials obtained from various plants such as kenaf, jute hemp, manila hemp, sisal hemp, ganpi, mitsumata, mulberry, banana, pineapple, coconut palm, corn, sugar cane, bagasse, palm, papyrus, reed, esparto, *Eulaliopsis binata*, wheat, rice, bamboo, various softwoods (cedar, cypress and the like), hardwoods and cotton can be incorporated, or may be contained.

A case will now be described where the microfiber cellulose or modified microfiber cellulose obtained as described above is kneaded with resin to obtain a resin composition.

The microfiber cellulose obtained by performing beating treatment is dispersed in an aqueous medium to obtain a dispersion. It is particularly preferable that the water-based medium is composed only of water, and a water-based medium, a part of which is another liquid having compatibility with water, can be preferably used. As the other liquid, a lower alcohol having 3 or less carbon atoms can be used.

The solid content concentration of the dispersion is preferably 1.0% by mass or more, more preferably 1.5% by mass or more, particularly preferably 2.0% by mass or more. The solid content concentration of the dispersion is preferably 70% by mass or less, more preferably 60% by mass or less, particularly preferably 50% by mass or less.

As raw material for the resin composition, for example, one or more selected from antistatic agents, flame retardants, antibacterial agents, colorants, radical scavengers, foaming agents, and the like can be used in addition to microfiber cellulose (or modified microfiber cellulose) and resin as long as the effect of the present invention is not hindered.

These raw materials may be kneaded concurrently with kneading the dispersion of the microfiber cellulose or the microfiber cellulose and the resin, kneaded with kneaded products thereof, or kneaded by another method. From the viewpoint of production efficiency, it is preferable to knead the raw materials concurrently with kneading the microfiber cellulose and the resin.

The blending ratio of the microfiber cellulose and the resin is preferably such that the amount of the microfiber cellulose is 1 part by mass or more and the amount of the resin is 99 parts by mass or less, more preferably such that the amount of the microfiber cellulose is 2 parts by mass or more and the amount of the resin is 98 parts by mass or less, particularly preferably such that the amount of the microfiber cellulose is 3 parts by mass or more and the amount of the resin is 97 parts by mass or less.

It is preferable that the amount of the microfiber cellulose is 50 parts by mass or less and the amount of the resin is 50 parts by mass or more, it is more preferable that the amount of the microfiber cellulose is 40 parts by mass or less and the amount of the resin is 60 parts by mass or more, and it is particularly preferable that the amount of the microfiber cellulose is 30 parts by mass or less and the amount of the resin is 70 parts by mass or more. When the microfiber cellulose is blended in an amount of 10 to 50 parts by mass, the strength, particularly the bending strength and the tensile strength, of the resin composition can be markedly enhanced.

The content ratio of the microfiber cellulose and the resin contained in the resin composition ultimately obtained is usually equal to the above-described blending ratio of the microfiber cellulose and the resin.

(Dehydration/Drying Treatment Step)

The microfiber cellulose may be subjected to dehydration treatment and drying treatment prior to kneading. That is, the dehydration/drying treatment of the microfiber cellulose is not required to be performed in parallel to kneading and modification, and the microfiber cellulose may be dried concurrently with the kneading. The dehydration treatment and the drying treatment may be performed in parallel to or separately from each other.

For the dehydration, for example, one or more selected from a belt press, a screw press, a filter press, a twin roll, a twin wire former, a valveless filter, a center disk filter, a film treatment unit, a centrifuge, and the like can be used.

For the drying treatment, for example, one or more selected from rotary kiln drying, disk drying, air flow drying, medium fluid drying, spray drying, drum drying, screw conveyor drying, paddle drying, uniaxial kneading drying, multiaxial kneading drying, vacuum drying, and stirring drying can be used.

Grinding treatment step may be added after the dehydration/drying treatment step. For the grinding treatment, for example, one or more selected from a bead mill, a kneader, a disperser, a twist mill, a cut mill, a hammer mill, and the like can be used.

The shape of the dehydrated/dried microfiber cellulose may be a powdery form, a pellet form, a sheet form, or the like. A powdery form is preferable.

In the case of a powdery form, the average particle size of the microfiber cellulose is preferably 10,000 to 1 μm, more preferably 5,000 to 10 μm, particularly preferably 1,000 to 100 μm. When the average particle size exceeds 10,000 μm, the particle size may be too large for a kneading apparatus to accommodate the microfiber cellulose. On the other hand, when the average particle size is less than 1 μm, the grinding treatment requires energy, resulting in poor economic efficiency.

In the case of a powdery form, the bulk specific gravity of the microfiber cellulose is preferably 0.01 to 1.5, more preferably 0.04 to 1, particularly preferably 0.1 to 0.5. A bulk specific gravity of more than 1.5 means that the specific gravity of cellulose is more than 1.5, which is physically impractical. On the other hand, a bulk specific gravity of less than 0.01 is disadvantageous from the viewpoint of transportation cost.

The moisture content of the dehydrated/dried microfiber cellulose is preferably 50% or less, more preferably 20% or less, still more preferably 10% or less, particularly preferably 0%. When the moisture content is more than 50%, a large amount of energy is required for kneading, resulting in poor economic efficiency.

The dehydrated/dried microfiber cellulose may contain a hydrophobizing agent for hydrophobic modification, or may be already hydrophobically modified in the dehydration/drying step.

The dehydrated/dried microfiber cellulose may contain resin. When resin is contained, hydrogen bonds between dehydrated/dried microfiber celluloses are hindered, so that it is possible to enhance dispersibility in the resin at the time of kneading.

Examples of the shape of the resin contained in the dehydrated/dried microfiber cellulose include a powdery form, a pellet shape and a sheet shape. A powdery form is preferable.

In the case of a powdery form, the average particle size of the resin powder contained in the dehydrated/dried microfiber cellulose is preferably 10,000 to 1 μm, more preferably 5,000 to 10 μm, particularly preferably 1,000 to 100 μm. When the average particle size exceeds 10,000 μm, the particle size may be too large for a kneading apparatus to accommodate the microfiber cellulose. On the other hand, when the average particle size is less than 1 μm, it may be impossible to hinder hydrogen bonds between the microfiber celluloses because of the small size.

(Kneading Treatment Step)

The microfiber cellulose and resin that have undergone the dehydration/drying treatment are subjected to kneading treatment. In the kneading, the microfiber cellulose may be modified with a hydrophobizing agent such as polybasic acid anhydride. Preferably, the microfiber cellulose is not immediately modified at the time of mixing the polybasic acid anhydride with the microfiber cellulose and the resin, but after undergoing the dehydration/drying treatment, the microfiber cellulose is modified with the resin used as a solvent at the time of kneading. Unlike in the case of Patent Literatures 1 and 2 described above, the raw material fiber is not made finer at the time of the kneading.

Preferably, the modification of the microfiber cellulose is performed so that the average fiber diameter is 1 μm or more, the ratio of fiber with a fiber length of 0.2 mm or less is 12% or more, and a part of hydroxyl groups of cellulose forming the fiber are substituted with a functional group represented by the following structural formula (1) or (2).

[Chemical Formula 1]

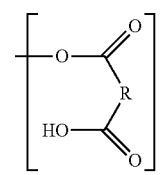

Structural formula (1)

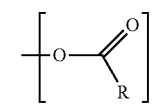

Structural formula (2)

R in the structural formula is one of a linear, branched or cyclic saturated hydrocarbon group or a derivative thereof; a linear, branched or cyclic unsaturated hydrocarbon group or a derivative thereof; and an aromatic group or a derivative thereof.

For the kneading treatment, for example, one or more selected from a single-screw or multi-screw kneading machine having two or more screws, a mixing roll, a kneader, a roll mill, a Banbury mixer, a screw press, a disperser, and the like can be used. Among them, it is preferable to use a multi-screw kneading machine having two or more screws. One or more multi-screw kneading machine having two or more screws may be used in parallel or in series.

The circumferential velocity of the screw of the multi-screw kneader having two or more screws is preferably 0.2 to 200 m/min, more preferably 0.5 to 150 m/min, particularly preferably 1 to 100 m/min. When the circumferential velocity is less than 0.2 m/min, the microfiber cellulose cannot be adequately dispersed in the resin. On the other hand, when the circumferential velocity is more than 200 m/min, the shear force on the microfiber cellulose becomes excessively high, so that a reinforcing effect cannot be obtained.

The ratio of the screw diameter to the length of the kneading section of the kneading machine for use in this embodiment is preferably 15 to 60. When the ratio is less than 15, it may be impossible to mix the microfiber cellulose with the resin because of the kneading section is short. If the ratio is more than 60, it may be impossible to obtain a reinforcing effect due to an increase in shear load on the microfiber cellulose because the kneading section is excessively long.

The temperature for the kneading treatment is equal to or higher than the glass transition point of the resin, and varies depending on the kind of resin, and this temperature is preferably 80 to 280° C., more preferably 90 to 260° C., particularly preferably 100 to 240° C.

The blending mass ratio of the microfiber cellulose in terms of solid content is preferably 1% to 70%, more preferably 5% to 50%, particularly preferably 10% to 40%.

The blending mass ratio of the polybasic acid anhydride in terms of solid content is preferably 0.1% to 30%, more preferably 0.5% to 20%, particularly preferably 1% to 10%.

At the time of kneading, maleic anhydride polypropylene may be added. The addition amount of maleic anhydride polypropylene is preferably 1 to 1000% by mass, more preferably 5 to 500% by mass, particularly preferably 10 to 200% by mass as a relative value against the blending amount of the microfiber cellulose which is set to 100. When the addition amount is less than 1% by mass, the effect is insufficient. On the other hand, an addition amount of more than 1000% by mass may lead to excessive addition which rather reduces the strength of the resin matrix.

At the time of kneading, an amine may be added as a measure to adjust the pH of a microfiber cellulose slurry. Examples of the amine include methylamine, dimethylamine, trimethylamine, ethylamine, diethylamine, triethylamine, ethylenediamine, triethanolamine, N,N-dimethylpropan-2-amine, tetramethylethyleneamine, hexamethylamine, spermidine, spermine, amantadine, aniline, phenethylamine, toluidine, catecholamine, 1,8-bis(dimethylamino)naphthalene, pyrrolidine, piperidine, piperazine, morpholine, quinuclidine, pyrrole, pyrazole, imidazole, pyridine, pyridazine, pyrimidine, pyrazine, oxazole, thiazole and 4-dimethylamino pyridine.

The addition amount of the amine is preferably 1 to 1,000% by mass, more preferably 5 to 500% by mass, particularly preferably 10 to 200% by mass as a relative value against the blending amount of the microfiber cellulose which is set to 100. When the addition amount is less than 1% by mass, pH adjustment is insufficient. On the other hand, an addition amount of more than 200% by mass may lead to excessive addition which rather reduces the strength of the resin matrix.

(Molding Treatment)

The modified microfiber cellulose and the resin (kneaded product) are kneaded again if necessary, and then molded into a desired shape. The kneaded product, in which modified microfiber cellulose is dispersed, has excellent moldability.

The size, the thickness, and the shape of the molded product are not particularly limited, and the molded product may have a sheet shape, a pellet shape, a powdery form, a fibrous shape or the like.

The temperature in the molding treatment is equal to or higher than the glass transition point of the resin, and varies depending on the kind of resin, and this temperature is preferably 80 to 280° C., more preferably 90 to 260° C., particularly preferably 100 to 240° C.

As an apparatus for molding treatment, for example, one or more selected from an injection molding machine, a flowing molding machine, a hollow molding machine, a blow molding machine, a compression molding machine, an extrusion molding machine, a vacuum molding machine, a pressure molding machine, and the like can be used.

The molding treatment can be performed by a known molding method, for example mold molding, injection molding, extrusion molding, hollow molding or foam molding. Alternatively, the kneaded product can be spun into a fibrous shape, and mixed with the above-described plant material or the like to form a mat shape or a board shape. The mixing can be performed by, for example, a method in which fiber is simultaneously stacked by air-lay.

The molding treatment can be performed subsequently to the kneading treatment, or performed by temporarily cooling the kneaded product, forming the molded product into chips by use of a grinding machine or the like, and then introducing the chips into a molding machine such as an extrusion molding machine or an injection molding machine.

Definition of Terms, Measurement Methods, Etc.

The terms used herein are as follows unless otherwise specified.

(Average Fiber Diameter)

100 ml of an aqueous dispersion of microfiber cellulose having a solid concentration of 0.01 to 0.1% by mass is filtered through a Teflon (registered trademark) membrane filter, and solvent substitution is performed once with 100 ml of ethanol and 3 times with 20 ml of t-butanol. Next, the resulting product is freeze-dried, and coated with osmium to obtain a sample. This sample is observed with an electron microscope SEM image at a magnification of 5000, 10000, or 30000 times, depending on the width of a fiber forming the sample. Specifically, two diagonals are drawn in the observation image, and further, three straight lines passing through the intersection of the diagonals are arbitrarily drawn. Further, the widths of a total of 100 filaments intersecting the three straight lines are visually measured. The median diameter of the measured values is defined as an average fiber diameter.

(Fiber Analysis)

The number average fiber diameter and the ratio of fiber with a fiber length of 0.2 mm or less are measured with a fiber analyzer "FS5" manufactured by Valmet K.K.

(Aspect Ratio)

The aspect ratio is a value obtained by dividing the average fiber length by the average fiber width (diameter).

(Degree of Crystallinity)

The degree of crystallinity is a value measured by the X-ray diffraction method in accordance with JIS-K0131 (1996), "General Rule of X-Ray Diffraction Analysis". In addition, microfiber cellulose has an amorphous part and a crystalline part, and the degree of crystallinity means a ratio of the crystalline part to the entire microfiber cellulose.

(Pulp Viscosity)

Measurement is performed in accordance with JIS-P8215 (1998). The higher the pulp viscosity, the higher the degree of polymerization of the microfiber cellulose.

(Freeness)

The freeness of cellulose fiber is a value obtained by performing measurement in accordance with JIS P8121-2 (2012).

EXAMPLES

The effect of the present invention will now be described by showing examples of the present invention. Specifically, it will be revealed that when hydrophobic modification is performed using polybasic acid anhydride or the like, use of microfiber cellulose (MFC) provide a superior resin reinforcing effect over use of cellulose nanofiber (CNF).

Example 1

A needle bleached kraft pulp (solid content: 3% by mass) slurry was treated 60 times with a refiner to obtain a microfiber cellulose slurry. The average fiber width of the obtained microfiber cellulose was measured by SEM, and confirmed to be 1 µm or more. When measured with the fiber analyzer "FS5", the number average fiber length was 0.16 mm and the ratio of fiber with a fiber length of 0.2 mm or less in the microfiber cellulose was 83%.

10 parts by mass (in terms of solid content) of the obtained microfiber cellulose slurry, 83 parts by mass of polypropylene powder and 7 parts by mass of phthalic anhydride were mixed to obtain a microfiber cellulose mixed solution. The obtained microfiber cellulose mixed solution was dried with a hot air dryer at 105° C. for 24 hours to obtain dried microfiber cellulose. The obtained dried microfiber cellulose was kneaded with a biaxial kneader to obtain macro-fiber cellulose composite polypropylene (composite resin).

Example 2

A composite resin was prepared in the same manner as in Example 1 except that the number of refiner treatments was changed to 10. The blending ratio of fibrous cellulose, phthalic anhydride and polypropylene was 10:7:83 on a mass basis as in Example 1. The average fiber width of the microfiber cellulose obtained through 10 refiner treatments was measured by SEM, and confirmed to be 1 µm or more. Further, when measured with the fiber analyzer "FS5", the number average fiber length was 1.60 mm and the ratio of fiber with a fiber length of 0.2 mm or less in the microfiber cellulose was 16%.

Example 3

A composite resin was prepared in the same manner as in Example 1 except that the number of refiner treatments was changed to 20. The blending ratio of fibrous cellulose, phthalic anhydride and polypropylene was 10:7:83 on a mass basis as in Example 1. The average fiber width of the microfiber cellulose obtained through 20 refiner treatments was measured by SEM, and confirmed to be 1 µm or more. Further, when measured with the fiber analyzer "FS5", the number average fiber length was 1.08 mm and the ratio of fiber with a fiber length of 0.2 mm or less in the microfiber cellulose was 26%.

Example 4

A composite resin was prepared in the same manner as in Example 1 except that the number of refiner treatments was changed to 30. The blending ratio of fibrous cellulose, phthalic anhydride and polypropylene was 10:7:83 on a mass basis as in Example 1. The average fiber width of the microfiber cellulose obtained through 30 refiner treatments was measured by SEM, and confirmed to be 1 µm or more. Further, when measured with the fiber analyzer "FS5", the number average fiber length was 0.65 mm and the ratio of fiber with a fiber length of 0.2 mm or less in the microfiber cellulose was 37%.

Example 5

A composite resin was prepared in the same manner as in Example 1 except that the number of refiner treatments was changed to 40. The blending ratio of fibrous cellulose, phthalic anhydride and polypropylene was 10:7:83 on a mass basis as in Example 1. The average fiber width of the microfiber cellulose obtained through 40 refiner treatments was measured by SEM, and confirmed to be 1 µm or more. Further, when measured with the fiber analyzer "FS5", the number average fiber length was 0.55 mm and the ratio of fiber with a fiber length of 0.2 mm or less in the microfiber cellulose was 41%.

Example 6

A composite resin was prepared in the same manner as in Example 1 except that the number of refiner treatments was changed to 50. The blending ratio of fibrous cellulose, phthalic anhydride and polypropylene was 10:7:83 on a mass basis as in Example 1. The average fiber width of the microfiber cellulose obtained through 50 refiner treatments was measured by SEM, and confirmed to be 1 µm or more. Further, when measured with the fiber analyzer "FS5", the number average fiber length was 0.29 mm and the ratio of fiber with a fiber length of 0.2 mm or less in the microfiber cellulose was 63%.

Example 7

A composite resin was prepared in the same manner as in Example 1 except that instead of the microfiber cellulose slurry, microfiber cellulose was mixed with polypropylene powder and phthalic anhydride. The blending ratio of fibrous cellulose, phthalic anhydride and polypropylene was 10:7:83 on a mass basis as in Example 1.

Example 8

A composite resin was prepared in the same manner as in Example 1 except that the addition amount of phthalic anhydride was changed to 4 parts by mass. The blending ratio of fibrous cellulose, phthalic anhydride and polypropylene was different from that in Example 1, and 10:4:86.

Example 9

A composite resin was prepared in the same manner as in Example 1 except that the addition amount of phthalic anhydride was changed to 9 parts by mass. The blending ratio of fibrous cellulose, phthalic anhydride and polypropylene was different from that in Example 1, and 10:9:81.

Comparative Example 1

A composite resin was prepared in the same manner as in Example 1 except that the microfiber cellulose was changed to CNF. The blending ratio of CNF, phthalic anhydride, and polypropylene was 10:7:83 on a mass basis. CNF was obtained by treating the same microfiber cellulose slurry as in Example 1 five times at a pressure of 210 MPa using a counter collision type high pressure homogenizer. The average fiber width of CNF was 60 nm or less.

Comparative Example 2

A composite resin was prepared in the same manner as in Example 1 except that phthalic anhydride was not added. The blending ratio of fibrous cellulose and polypropylene was 10:90 on a mass basis.

Comparative Example 3

A composite resin was prepared in the same manner as in Comparative Example 1 except that phthalic anhydride was not added. The blending ratio of CNF and polypropylene was 10:90 on a mass basis.

Comparative Example 4

A composite resin was prepared in the same manner as in Example 1 except that the microfiber cellulose was changed to needle bleached kraft pulp. The blending ratio of kraft pulp, phthalic anhydride and polypropylene was 10:7:83 on a mass basis.

Table 1 shows the test results of the bending test. The bending test method and evaluation method are as follows.
(Bending Test)
Each resin was molded into a bending test piece, and the bending elastic modulus of this molded product was examined. The bending elastic modulus was measured in accordance with JIS K7171: 2008. The table shows the results of evaluating the strength of each composite resin is shown on the basis of the following criteria.
  ○: The bending elastic modulus of the composite resin as a relative value against the blending elastic modulus of the resin itself which is set to 1 (ratio) is 1.5 or more.
  Δ: The bending elastic modulus of the composite resin as a relative value against the blending elastic modulus of the resin itself which is set to 1 (ratio) is less than 1.5 and not more than 1.3.
  x: The bending elastic modulus of the composite resin as a relative value against the blending elastic modulus of the resin itself which is set to 1 (ratio) is less than 1.3.

From Table 1, it is apparent that it is preferable to use microfiber cellulose rather than CNF particularly when basic acid anhydride is used.

INDUSTRIAL APPLICABILITY

As described above, the resin composition of the present invention has strength higher than that of conventional resin (strength enhancing effect). Therefore, the resin composition can be used not only in applications where the resin has been heretofore used, but also in applications where resin has not been used because resin has insufficient strength. Preferably, the resin composition can be suitably used for thermoplastic resin having the essential physical properties as materials which have high mechanical strength while maintaining ductility and which are used for automobile interior materials, toys and the like.

Specifically, for example, the resin composition can be used for interior materials, exterior materials, structural materials, and the like of transportation equipment such as automobiles, trains, vessels and airplanes;

housings, structural materials, internal components, and the like of electronic goods, and the like such as personal computers, televisions, telephones and clocks;

housings, structural materials and internal components of mobile communication equipment, and the like such as mobile phones;

housings, structural materials, internal components, and the like of mobile music reproduction equipment, video reproduction equipment, printing equipment, copying equipment, sports goods, office equipment, toys, sports goods;

interior materials, exterior materials, structural materials and the like of buildings, furniture, and the like;

office equipment such as stationery; and packages, containers such as trays, protection members, partition members, and the like.

Examples of the automobile applications among the above applications include interior materials, instrument

TABLE 1

| | Fibrous cellulose | Ratio of fiber with a fiber length of 0.2 mm or less | Chemical | Addition amount of chemical | Object to which chemical is added | Bending test evaluation |
|---|---|---|---|---|---|---|
| Example 1 | MFC | 83% | Phthalic anhydride | 7 parts by mass | Slurry | ○ |
| Example 2 | MFC | 83% | Phthalic anhydride | 7 parts by mass | Dried product | ○ |
| Example 3 | MFC | 16% | Phthalic anhydride | 7 parts by mass | Slurry | ○ |
| Example 4 | MFC | 26% | Phthalic anhydride | 7 parts by mass | Slurry | ○ |
| Example 5 | MFC | 37% | Phthalic anhydride | 7 parts by mass | Slurry | ○ |
| Example 6 | MFC | 41% | Phthalic anhydride | 7 parts by mass | Slurry | ○ |
| Example 7 | MFC | 63% | Phthalic anhydride | 7 parts by mass | Slurry | ○ |
| Example 8 | MFC | 83% | Phthalic anhydride | 4 parts by mass | Slurry | ○ |
| Example 9 | MFC | 83% | Phthalic anhydride | 9 parts by mass | Slurry | ○ |
| Comparative Example 1 | CNF | — | Phthalic anhydride | 7 parts by mass | Slurry | Δ |
| Comparative Example 2 | MFC | 83% | None | — | Slurry | Δ |
| Comparative Example 3 | CNF | — | None | — | Slurry | x |
| Comparative Example 4 | Pulp | 7% | Phthalic anhydride | 7 parts by mass | Slurry | Δ | panels and exterior materials. Specific examples thereof include door base materials, package trays, pillar garnishes, switch bases, quarter panels, armrest core materials, door trims, seat structure materials, console boxes, dashboards, various instrument panels, deck trims, bumpers, spoilers and cowlings.

Examples of the building and furniture applications include various furniture covering materials such as door covering materials, door structural materials, desks, chairs, shelves and drawers.

The invention claimed is:

1. Fibrous cellulose which is microfiber cellulose with an average fiber diameter of 1 μm or more and a degree of crystallinity from 50% to 90%, the microfiber cellulose being hydrophobically modified.

2. The fibrous cellulose according to claim 1, wherein in the microfiber cellulose, the average fiber diameter is 1 μm or more, at least 12% of the fiber has a fiber length of 0.2 mm or less, and a part of hydroxyl groups of cellulose forming the fiber are substituted with a functional group represented by the following structural formula (1) or (2):

[Chemical Formula 1]

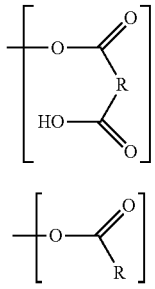

Structural formula (1)

Structural formula (2)

wherein R in the structural formula is one of a linear, branched or cyclic saturated hydrocarbon group or a derivative thereof; a linear, branched or cyclic unsaturated hydrocarbon group or a derivative thereof; and an aromatic group or a derivative thereof.

3. A resin composition comprising the fibrous cellulose described in claim 1, and resin.

4. A method for manufacturing fibrous cellulose, comprising defibrating raw material fiber to obtain microfiber cellulose with an average fiber diameter of 1 μm or more and a degree of crystallinity from 50% to 90%, and hydrophobically modifying the microfiber cellulose.

5. The method for manufacturing fibrous cellulose according to claim 4, wherein the hydrophobic modification is performed by reaction of the microfiber cellulose with polybasic acid anhydride, and as the polybasic acid anhydride, one represented by the structural formula (3) or (4) is used:

[Chemical Formula 2]

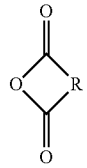

Structural formula (3)

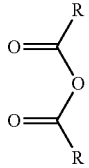

Structural formula (4)

wherein R in the structural formula is one of a linear, branched or cyclic saturated hydrocarbon group or a derivative thereof; a linear, branched or cyclic unsaturated hydrocarbon group or a derivative thereof; and an aromatic group or a derivative thereof.

6. A resin composition comprising the fibrous cellulose described in claim 2, and resin.

* * * * *